United States Patent
Yu et al.

(10) Patent No.: US 10,178,369 B2
(45) Date of Patent: Jan. 8, 2019

(54) IMAGE BRIGHTNESS ADJUSTMENT DEVICE AND METHOD, AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Shuhuan Yu, Beijing (CN); Peng Cheng, Beijing (CN)

(73) Assignees: BOE Technology Group Co., Ltd., Beijing (CN); Beijing BOE Multimedia Technology Co., Ltd., Beijing (CN)

( * ) Notice: Subject to any disclaimer, the term of this patent is extended or adjusted under 35 U.S.C. 154(b) by 172 days.

(21) Appl. No.: 14/892,519

(22) PCT Filed: Jul. 20, 2015

(86) PCT No.: PCT/CN2015/084437
§ 371 (c)(1),
(2) Date: Nov. 19, 2015

(87) PCT Pub. No.: WO2016/115849
PCT Pub. Date: Jul. 28, 2016

(65) Prior Publication Data
US 2016/0360179 A1    Dec. 8, 2016

(30) Foreign Application Priority Data

Jan. 19, 2015 (CN) .......................... 2015 1 0025828

(51) Int. Cl.
*H04N 13/00* (2018.01)
*G09G 5/10* (2006.01)
(Continued)

(52) U.S. Cl.
CPC .......... *H04N 13/133* (2018.05); *G06F 3/147* (2013.01); *G09G 5/10* (2013.01);
(Continued)

(58) Field of Classification Search
None
See application file for complete search history.

(56) References Cited

U.S. PATENT DOCUMENTS

2010/0020205 A1    1/2010   Ishida et al.
2012/0169789 A1*   7/2012   Origuchi ................ G09G 3/294
                                                             345/690
(Continued)

FOREIGN PATENT DOCUMENTS

CN    1664858       9/2005
CN    101263545     9/2008
(Continued)

OTHER PUBLICATIONS

International Search Report from PCT Application No. PCT/CN2015/084437, dated Aug. 28, 2015, 5 pages.
(Continued)

*Primary Examiner* — Joseph Haley
*Assistant Examiner* — Emily Frank
(74) *Attorney, Agent, or Firm* — Harness, Dickey & Pierce, P.L.C.

(57) ABSTRACT

An image brightness adjustment device, comprising an image data processing unit for extracting brightness values of subpixels arranged in a matrix manner in a frame image according to the received image data, wherein each two adjacent subpixels in a frame image form one group, a calculating unit for calculating a difference between brightness values of the two subpixels in at least part of groups and outputting a calculation result, and a comparing unit for comparing the calculation result with a predetermined value
(Continued)

Q, a brightness adjusting unit for adjusting the brightness values of the two subpixels in the group if the calculation result is greater than the predetermined value Q, a display data generating unit for generating display data from the image data if the calculation result is smaller than or equal to the predetermined value Q, and generating display data from the adjusted image data if the calculation result is greater than the predetermined value Q.

10 Claims, 2 Drawing Sheets

(51) Int. Cl.
*H04N 13/133* (2018.01)
*G06F 3/147* (2006.01)

(52) U.S. Cl.
CPC ........ *G09G 2320/0209* (2013.01); *G09G 2320/0626* (2013.01); *G09G 2360/147* (2013.01); *G09G 2360/16* (2013.01)

(56) References Cited

U.S. PATENT DOCUMENTS

| | | | |
|---|---|---|---|
| 2013/0016189 A1* | 1/2013 | Hosaka | G03B 35/08 348/49 |
| 2014/0132851 A1 | 5/2014 | Cossairt et al. | |
| 2016/0191890 A1* | 6/2016 | Kawano | H04N 13/0025 382/154 |

FOREIGN PATENT DOCUMENTS

| | | |
|---|---|---|
| CN | 101661615 | 3/2010 |
| CN | 101820552 | 9/2010 |
| CN | 101998131 | 3/2011 |
| CN | 102484675 | 5/2012 |
| CN | 102549644 | 7/2012 |
| CN | 103439798 | 12/2013 |
| CN | 104539935 | 4/2015 |
| WO | 2014/045915 | 3/2014 |

OTHER PUBLICATIONS

Written Opinion of the International Searching Authority from PCT Application No. PCT/CN2015/084437, dated Aug. 28, 2015, 5 pages.

Second Office Action from Chinese Application No. 201510025828.7, dated Aug. 5, 2016, 8 pages.

* cited by examiner

IMAGE BRIGHTNESS ADJUSTMENT DEVICE AND METHOD, AND DISPLAY DEVICE

FIELD OF THE INVENTION

This invention belongs to the technical field of 3D stereoscopic display, more particularly, to an image brightness adjustment method and adjustment device, and a display device.

BACKGROUND OF THE INVENTION

A stereoscopic display, i.e., 3D display technology, mainly obtains two images of the same object at different angles based on a person's vision, and projects the two images into the left eye and the right eye of the person, respectively, causing a certain parallax between the image in the left eye and the image in the right eye. By synthesizing the left eye image and the right eye image with a parallax therebetween, the person's brain will form a depth perception, that is, a display effect of a stereoscopic image is formed.

Currently, there are a variety of methods for generating and displaying a stereoscopic image. In the aspect of display, the methods include using colorfiltering glasses or polarized lenses to separate the left eye image from the right eye image, and using a shutter device to instantaneously select the left eye image and the right eye image transmitted time-sharing continuously. In a 3D display, 3D time-sharing display technology is primarily used, i.e., continuously displaying the left eye image and the right eye image with a certain parallax therebetween on a display screen. A viewer wears glasses with time-sharing photoswitches. When the left eye image is displayed, the time-sharing photoswitch in front of the left eye is turned on and the time-sharing photoswitch in front of the right eye is turned off. On the contrary, when the right eye image is displayed, the time-sharing photoswitch in front of the right eye is turned on and the time-sharing photoswitch in front of the left eye is turned off, so as to ensure the left eye and the right eye of the viewer are input with the left eye image and the right eye image, respectively, thereby achieving a 3D display effect.

The inventor discovers that the prior art has at least the following problem: contrast ratios of some images during display may be comparatively large. Researches find that an image with a large contrast ratio will affect the display effect of a next frame image due to restrictions by properties of a display device (e.g., turnover time of liquid crystal). In the usual 2D display, an image is continuously and simultaneously provided to both eyes, so the effect is not obvious. However, during 3D display, if a frame image that enters an eye (e.g., the left eye) has a large contrast ratio, the next frame image will be affected. As the left eye image and the right eye image are alternating, the image affected in this frame is the one that enters the other eye (e.g., the right eye), so the left eye image will affect the right eye image, i.e., crosstalk occurs between the left eye image and the right eye image, as a consequence, the viewing effect of the synthesized 3D image is affected.

SUMMARY OF THE INVENTION

Embodiments of the present invention provide an image brightness adjustment method and adjustment device, and a display device for eliminating 3D display crosstalk.

The embodiments according to the invention provide an image brightness adjustment method, comprising the steps of:

receiving image data, and extracting brightness values of subpixels arranged in a matrix manner in a frame image according to the image data, wherein each two adjacent subpixels in a frame image form one group;

calculating a difference between brightness values of the two subpixels in at least part of groups and outputting a calculation result; and comparing the calculation result with a predetermined value Q; generating display data from the image data if the calculation result is smaller than or equal to the predetermined value Q; adjusting the brightness values of the compared two subpixels if the calculation result is greater than the predetermined value Q, and then generating display data from the adjusted image data.

Further, a difference between brightness values of the two subpixels in all the groups is calculated and a calculation result is output.

Further, the two adjacent subpixels in one group in a frame image are arranged in the same line or in the same row.

Further, the brightness value of one of the two subpixels in one group is A, and the brightness value of the other is B, and A>B; when A−B>Q, said adjusting the brightness values of the compared two subpixels comprises: calculating an average value X of the brightness values for M*N subpixels centering around a subpixel having a brightness value A or around a subpixel having a brightness value B, wherein $10 \leq M \leq 100$, $10 \leq N \leq 100$;

adjusting the brightness value of the subpixel having the brightness value A to A', A'=A−X/2; and adjusting the brightness value of the subpixel having the brightness value B to B', B'=B+X/2;

Still further, both M and N are equal to 10.

Still further, the predetermined value $Q \geq 180$.

The embodiments according to the invention further provide an image brightness adjustment device, comprising:

an image data processing unit for extracting brightness values of subpixels arranged in a matrix manner in a frame image according to the received image data, wherein each two adjacent subpixels in a frame image form one group;

a calculating unit for calculating a difference between brightness values of the two subpixels in at least part of groups and outputting a calculation result; and a comparing unit for comparing the calculation result with a predetermined value Q;

a brightness adjusting unit for adjusting the brightness values of the two subpixels in the group if the calculation result is greater than the predetermined value Q;

a display data generating unit for generating display data from the image data if the calculation result is smaller than or equal to the predetermined value Q, and generating display data from the adjusted image data if the calculation result is greater than the predetermined value Q.

Further, the calculating unit is for calculating a difference between brightness values of the two subpixels in all the groups and outputting a calculation result.

Further, the brightness value of one of the two subpixels in one group is A, and the brightness value of the other is B, and A>B; the brightness adjusting unit comprises a first calculation module and a correction module, the first calculation module for calculating, when A−B>Q, an average value X of the brightness values for M*N subpixels centering around a subpixel having a brightness value A or around a subpixel having a brightness value B, wherein $10 \leq M \leq 100$, $10 \leq N \leq 100$;

the correction module for adjusting the brightness value of the subpixel having the brightness value A to A', A'=A−X/2; and adjusting the brightness value of the subpixel having the brightness value B to B', B'=B+X/2.

The embodiments according to the invention further provide a display device comprising the image brightness adjustment device above.

The image brightness adjustment method provided by the embodiments of the invention is particularly applicable to a 3D display panel, wherein a difference between brightness values of the two subpixels in one group in a frame image is first calculated. The brightness values of the two subpixels in the group are adjusted if the calculation result is greater than a predetermined value Q, so that it is guaranteed that a difference between brightness values of the two subpixels in the group is not too great to ensure that a contrast ratio of the frame image will not be too large (certainly, the effect is associated with the number of compared groups). Thus, crosstalk will not occur between the left eye image and the right eye image, or crosstalk is not serious.

The image brightness adjustment device provided by the embodiments of the invention is particularly applicable to a 3D display device, wherein a difference between brightness values of the two subpixels in one group in a frame image is calculated. The brightness values of the two subpixels in the group are adjusted if the calculation result is greater than a predetermined value Q, so that it is guaranteed that a difference between brightness values of the two subpixels in the group is not too great to ensure that a contrast ratio of the frame image will not be too large (certainly, the effect is associated with the number of compared groups). Thus, crosstalk will not occur between the left eye image and the right eye image, or crosstalk is not serious.

The display device provided by the embodiments of the invention comprises the image brightness adjustment device above, so it has better properties, and crosstalk will not occur between the left eye image and the right eye image, or crosstalk is not serious.

DETAILED DESCRIPTION OF THE ILLUSTRATIVE EMBODIMENTS

In order to make those skilled in the art better understand the technical solution of the invention, the following descriptions are further made in detail in combination with figures and embodiments.

Embodiment 1

Figure 1:
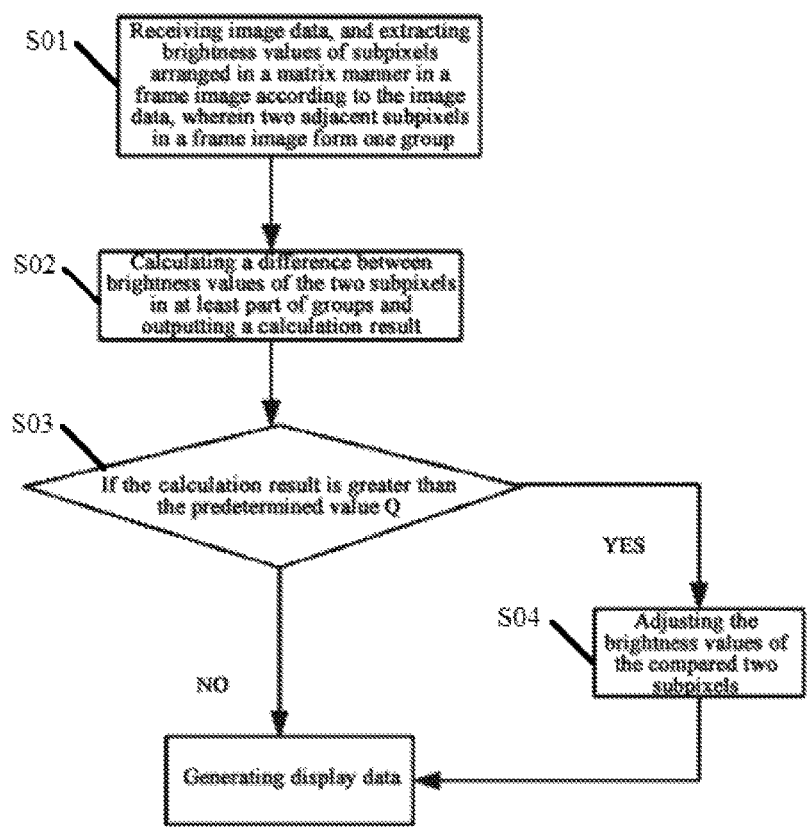
FIG. 1 is a flowchart illustrating an image brightness adjustment method provided by embodiment 1 of the invention.

As shown in FIG. 1, the embodiment provides an image brightness adjustment method, comprising steps S01-S04.

S01: receiving image data, and extracting brightness values (i.e., grayscale values) of subpixels arranged in a matrix manner in a frame image according to the image data, wherein each two adjacent subpixels in a frame image form one group.

In the step, the image data refers to image data of a 3D image to be displayed, comprising brightness values of subpixels in the image to be displayed.

Wherein, the two subpixels in one group are preferably both arranged in the same line or in the same row. This division manner is a more regular division, and it makes the subsequent calculation process easier.

It is understandable that in a frame image, the two subpixels in some groups are arranged in the same line and the two subpixels in the other groups are arranged in the same row, as long as each two adjacent subpixels are divided into one group.

S02: calculating a difference between brightness values of the two subpixels in at least part of groups and outputting a calculation result.

In the step, preferably, a difference between brightness values of the two subpixels in all the groups is calculated and a calculation result is output, so that it is guaranteed that a difference between brightness values of the two subpixels in all the groups in each frame image is not too great in order to reduce, to the largest extent, a possibility that the frame image has a comparatively large contrast ratio.

S03: comparing the calculation result output at step S02 with a predetermined value Q; directly generating display data from the image data if the calculation result is smaller than or equal to the predetermined value Q; performing the following step S04 if the calculation result is greater than the predetermined value Q.

In the step, the predetermined value Q is a man-made brightness value (grayscale value). Different predetermined values Q may be set based on the resolution of display panel or the like to ensure the contrast ratio of each frame image is not too large while the display effect is affected as little as possible. In the embodiment, the predetermined value Q is not smaller than 180 (i.e., 180 greyscales). The more the difference between the two subpixels in one group is greater than 180, the more the brightness values of the two subpixels in the group need to be adjusted.

S04: adjusting the brightness values of the compared two subpixels, and then generating display data from the adjusted image data.

Wherein take the step that a brightness value of one of the two subpixels in one group is A, and a brightness value of the other is B, and A>B, A−B>Q for instance, the step specifically comprises:

calculating an average value X of the brightness values for M*N subpixels centering around a subpixel having a brightness value A or around a subpixel having a brightness value B, wherein $10 \leq M \leq 100$, $10 \leq N \leq 100$;

adjusting the brightness value of the subpixel having a brightness value A to A', A'=A−X/2; and adjusting the brightness value of the subpixel having a brightness value B to B', B'=B+X/2;

and then generating display data from the adjusted image data.

In other words, when brightness values of subpixels in one group need to be adjusted, preferably the adjustment may be mainly based on an average value of brightness values of a plurality of subpixels around the subpixels in the group. That is, adding a half of the average value to the brightness value of the subpixel with a low brightness, and deducting a half of the average value from the brightness value of the subpixel with a high brightness. This adjustment method may contribute to reducing an impact of the adjustment on the display effect as much as possible.

The step only provides a method for adjusting the brightness values of the compared two subpixels, and does not constitute limitations on the embodiment. Any algorithms with similar adjustments are within the protection scope of the embodiment. Moreover, in order to better adjust brightness values of pixels on the display panel to ensure that the display panel will not have a too large contrast ratio, M and N used in the embodiment are preferably equal to 10. Certainly, values for M and N are not necessarily fixed and may be selected based on size and resolution of the display panel.

The image brightness adjustment method in the embodiment is particularly applicable to a 3D display panel, wherein a difference between brightness values of the two subpixels in one group in a frame image is first calculated. The brightness values of the two subpixels in the group are adjusted if the calculation result is greater than a predetermined value Q, so that it is guaranteed that a difference between brightness values of the two subpixels in the group is not too great to ensure that a contrast ratio of the frame image will not be too large (certainly, the effect is associated with the number of compared groups). Thus, crosstalk will not occur between the left eye image and the right eye image, or crosstalk is not serious.

Embodiment 2

Figure 2:
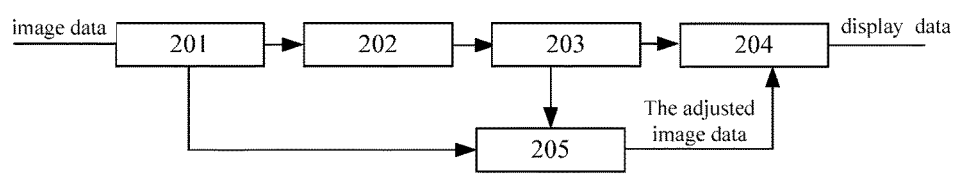
FIG. 2 is a schematic block diagram illustrating an image brightness adjustment device provided by embodiment 1 of the invention.

As shown in FIG. 2, the embodiment provides an image brightness adjustment device, comprising an image data processing unit 201, a calculating unit 202, a comparing unit 203, and a display data generating unit 204, wherein, the image data processing unit 201 is for extracting brightness values of subpixels arranged in a matrix manner in a frame image according to the received image data, wherein each two adjacent subpixels in a frame image form one group, and wherein the image processing unit is usually an MCU (microprocessor);

the calculating unit 202 is for calculating a difference between brightness values of the two subpixels in at least part of groups and outputting a calculation result; and the comparing unit 203 is for comparing the calculation result with a predetermined value Q;

a brightness adjusting unit 205 is for adjusting the brightness values of the two subpixels in the group if the calculation result is greater than the predetermined value Q;

the display data generating unit 204 is for generating display data from the image data if the calculation result is smaller than or equal to the predetermined value Q, and generating display data from the adjusted image data if the calculation result is greater than the predetermined value Q.

It needs to be specified that the image brightness adjustment method according to embodiment 1 may be applied to the image brightness adjustment device provided by the embodiment.

The image brightness adjustment device provided by the embodiment is particularly applicable to a 3D display device, wherein a difference between brightness values of the two subpixels in one group in a frame image is first calculated. The brightness values of the two subpixels in the group are adjusted if the calculation result is greater than a predetermined value Q, so that it is guaranteed that a difference between brightness values of the two subpixels in the group is not too great to ensure that a contrast ratio of the frame image will not be too large (certainly, the effect is associated with the number of compared groups). Thus, crosstalk will not occur between the left eye image and the right eye image, or crosstalk is not serious.

Further, the calculating unit 202 in the embodiment is for calculating a difference between brightness values of the two subpixels in all the groups and outputting a calculation result, so that it is guaranteed that a difference between brightness values of the two subpixels in all the groups in each frame image is not too great in order to reduce, to the largest extent, a possibility that the frame image has a comparatively large contrast ratio.

Figure 3:
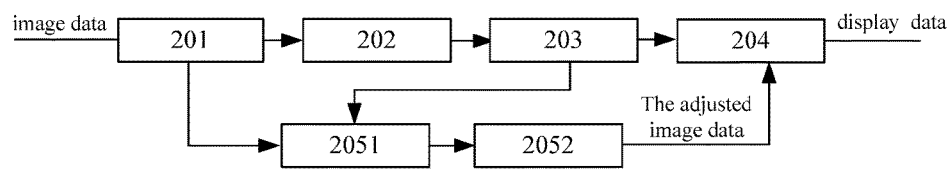
FIG. 3 is a schematic block diagram illustrating another image brightness adjustment device provided by embodiment 1 of the invention.

As shown in FIG. 3, Further, the brightness adjusting unit 205 comprises a first calculation module 2051 and a correction module 2052. Take the feature that the brightness value of one of the two subpixels in one group is A, and the brightness value of the other is B, and A>B for instance, wherein the first calculation module 2051 is for calculating, when A−B>Q, an average value X of the brightness values for M*N subpixels centering around a subpixel having a brightness value A or around a subpixel having a brightness value B, wherein $10 \leq M \leq 100$, $10 \leq N \leq 100$; the correction module 2052 is for adjusting the brightness value of the subpixel having the brightness value A to A', A'=A−X/2; and adjusting the brightness value of the subpixel having the brightness value B to B', B'=B+X/2.

In the embodiment, the predetermined value Q is stored in the comparing unit 203 and is a man-made brightness value (grayscale value). Different predetermined values Q may be set based on the resolution of display panel or the like to ensure the contrast ratio of each frame image is not too large while the display effect is affected as little as possible. In the embodiment, the predetermined value Q is not less than 180 (i.e., 180 greyscales). The more the difference between the two subpixels in one group is larger than 180, the more the brightness values of the two subpixels in the group need to be adjusted. Moreover, in order to better adjust brightness values of pixels on the display panel to ensure that the display panel will not have a too large contrast ratio, M and N used in the calculations above are preferably equal to 10. Certainly, values for M and N are not necessarily fixed and may be selected based on size and resolution of the display panel.

The image brightness adjustment device provided by the embodiment can effectively reduce a possibility that each frame image has a comparatively large contrast ratio, so that crosstalk will not occur between the left eye image and the right eye image, or crosstalk is not serious.

Embodiment 3

The embodiment provides a display device, comprising the image brightness adjustment device according to embodiment 2, so it has better properties. Thus, crosstalk will not occur between the left eye image and the right eye image, or crosstalk is not serious.

The display device provided by the invention may be any mode of liquid crystal display device, such as, TN, ADS, IPS, LTPS or the like. The display device may be any product or component having a display function, such as, a liquid crystal panel, a liquid crystal television, a display, a cellphone, a navigator or the like.

It is understandable that the aforesaid embodiments are only exemplary embodiments for illustrating the principle of the invention. Indeed, the invention is not limited to this. Without departing from the spirit and essence of the invention, those skilled in the art may make various modifications and improvements to the invention, which should be deemed to fall within the protection scope claimed by the invention.

What is claimed is:

1. An image brightness adjustment device, comprising:
one or more microprocessors configured to:
extract brightness values of subpixels arranged in a matrix manner in a frame image according to received image data, each two adjacent subpixels in the frame image forming one group, the image data including a 3D image;
calculate a difference between brightness values of the two subpixels in at least one of the groups, and output a calculation result, wherein the brightness value of one of the two subpixels in said one of the groups is A, the brightness value of the other subpixel in said one of the groups is B, and A>B;
compare the calculation result with a predetermined value Q, and when A−B>Q, calculate an average value X of the brightness values for M*N subpixels centered around the subpixel having the brightness value A or around the subpixel having the brightness value B, where 10≤M≤100 and 10≤N≤100;
adjust the brightness values of the two subpixels in the group only when the calculation result is greater than the predetermined value Q, by reducing the difference between the brightness values of the two subpixels in the group by adjusting the brightness value of the subpixel having the brightness value A to A', where A'=A−X/2, and adjusting the brightness value of the subpixel having the brightness value B to B', where B'=B+X/2; and
generate display data from the image data when the calculation result is smaller than or equal to the predetermined value Q, and generate display data from the adjusted image data when the calculation result is greater than the predetermined value Q.

2. The image brightness adjustment device according to claim 1, wherein the one or more microprocessors are configured to calculate a difference between brightness values of the two subpixels in all the groups and output the calculation result.

3. A display device comprising the image brightness adjustment device according to claim 2.

4. A display device comprising the image brightness adjustment device according to claim 1.

5. An image brightness adjustment method, the method comprising:
receiving image data, and extracting brightness values of subpixels arranged in a matrix manner in a frame image according to the image data, each two adjacent subpixels in the frame image forming one group, the image data including a 3D image;
calculating a difference between brightness values of the two subpixels in at least one of the groups and outputting a calculation result, wherein the brightness value of one of the two subpixels in said one of the groups is A, the brightness value of the other subpixel in said one of the groups is B, and A>B;
comparing the calculation result with a predetermined value Q, and when A−B>Q, calculating an average value X of the brightness values for M*N subpixels centered around the subpixel having the brightness value A or around the subpixel having the brightness value B, where 10≤M≤100 and 10≤N≤100;
generating display data from the image data when the calculation result is smaller than or equal to the predetermined value Q;
adjusting the brightness values of the compared two subpixels only when the calculation result is greater than the predetermined value Q, by reducing the difference between the brightness values of the two subpixels in the group by adjusting the brightness value of the subpixel having the brightness value A to A', where A'=A−X/2, and adjusting the brightness value of the subpixel having the brightness value B to B', where B'=B+X/2; and
generating display data from the adjusted image data.

6. The image brightness adjustment method according to claim 5, wherein a difference between brightness values of the two subpixels in all the groups is calculated and the calculation result is output.

7. The image brightness adjustment method according to claim 6, wherein the two adjacent subpixels in one group in the frame image are arranged in the same line or in the same row.

8. The image brightness adjustment method according to claim 5, wherein the two adjacent subpixels in one group in the frame image are arranged in the same line or in the same row.

9. The image brightness adjustment method according to claim 5, wherein both M and N are equal to 10.

10. The image brightness adjustment method according to claim 5, wherein the predetermined value Q≥180.

* * * * *